United States Patent Office

3,388,087
Patented June 11, 1968

3,388,087
AQUEOUS DISPERSIONS OF QUATERNIZED POLYURETHANES
Dieter Dieterich and Otto Bayer, Leverkusen, and Julius Peter, Odenthal, Buchmuhle, Germany, assignors to Farbenfabriken Bayer Aktiengesellschaft, Leverkusen, Germany, a German corporation
No Drawing. Filed Oct. 23, 1963, Ser. No. 318,197
Claims priority, application Germany, Oct. 26, 1962,
F 38,153
6 Claims. (Cl. 260—29.2)

ABSTRACT OF THE DISCLOSURE

Aqueous dispersions of quarternized polyurethane compositions are prepared by making an organic solvent solution of the quarternized polyurethane and then replacing the polyurethane with water to get the dispersion.

This invention relates to plastics and more particularly to plastics which contain the urethane linkage and a method of producing cross-linked plastics from polymers of polyols and organic polyisocyanate.

It is known to treat compounds of high molecular weight, more especially polyurethanes, which contain basic nitrogen atoms, with polyfunctional peralkylation agents, and thus to convert them with simultaneous cross-linking into polyquaternization polymers. The concurrent use of monofunctional quarternizing agents has resulted in an increase in solubility in hydrophilic media (German patent specification No. 880,485).

The increase in the hydrophilic nature of a substance of high or low molecular weight by monofunctional quaternization is generally known and is widely used. However, since a cross-linking or lengthening of the chain is not effected just by quaternization with monofunctional alkylation agents, the concurrent use of polyfunctional alkylation agents or other types of cross-linking agents, for example based on urea formaldehyde, has hitherto been advised for the production of cross-linked, and thereby water-insoluble, elastic non-tacky materials. In order to exclude premature cross linking, this generally requires the use of binary system and/or an after-treatment for example by the action of an increased temperature to cause cross-linking.

It is, therefore, an object of this invention to provide cross-linked plastics. Another object of this invention is to provide an improved method of making polyurethane plastics. Still a further object of this invention is to provide improved polyurethane plastics which are solutions or dispersions of polyquaternized compounds. A still further object of this invention is to provide improved cross-linked elastic non-tacky water-soluble materials prepared from predominately linear polyquaternized polyurethanes. A further object of the invention is to provide elastic synthetic plastics, more especially foils, coatings and adhesion promotors, from solutions based on polyhydroxyl compounds, polyisocyanates and possibly chain extenders containing reactive hydrogen atoms.

The foregoing objects and others which will become apparent from the following description are accomplshed in accordance with the invention, generally speaking, by providing a plastic prepared by a process which comprises reacting an organic polyol with an organic polyisocyanate, and possibly a chain extender to prepare an intitial product, at least one of the components of the initial product contains at least (a) a tertiary nitrogen atom, (b) a halogen atom or (c) an R—SO₂—O-group (in which R represents an organic radical preferably having 1 to 12 carbon atoms as an alkyl or aryl radical) said initial product is then reacted in solution with a monofunctional alkylation agent in case (a), and with a tertiary amine in cases (b) and (c). By organic polyol is meant a compound containing a plurality of hydroxyl groups which are preferably alcoholic hydroxyl groups. There is thus produced a reaction product, in solution, from a polyhydroxyl compound and a polyisocyanate, if desired with concurrent use of a chain extender, which product contains groups which are capable of quaternization in at least one of the components. By this quaternization process, materials are obtained in which salt-like quaternized and organophilic molecule segments alternate with one another, the organophilic segments having a chain length of at least 50 atoms. The generally rubber-like reaction products are quaternized in solution, whereupon an elastic cross-linked synthetic plastic is formed after suitable removal of the solvent.

The polyhydroxyl compounds are preferably predominately linear and preferably have a molecular weight of about 400–about 10,000 most advantageously 1,000–3,000. Included are for example polyethers, polyesters, polyacetals, polyester amides and polythioethers. Examples of polyethers are the polymerization products of tetrahydrofuran, propylene oxide and ethylene oxide, as well as mixed or graft polymerization products. It is also possible to start from homogenous or mixed polyethers which may be obetained by condensation of 1,6-hexanediol, 2-methyl-1,6-hexanediol, 1,7-heptanediol, 1,8-octanediol and the like, perhaps with addition of about 10–about 30 percent of lower glycols such as ethylene glycol, propylene glycol and the like. Ethoxylated and propoxylated (or mixed alkoxylated) glycols may also be used. If the polyether is to contain the quaternizable group, then alkoxylated and more especially propoxylated glycols with tertiary amino groups, such as propoxylated methyl diethanolamine or alkoxylated primary amines (for example alkoxylated aniline, toluidine and hydrazine) are mentioned as examples. In this case, each polyether molecule contains a quaternizable nitrogen atom.

Among the polythioethers, there are more especially to be mentioned condensation products of thiodiglycol with itself or with other glycols, among which can also be those which contain tertiary amino groups (e.g. dihydroxyethylaniline).

As polyacetals, there are to be mentioned more especially the water-insoluble types of hexanediol and formaldehyde or hexanediol and divinyl ether, as well as of 4,4'-dihydroxyethoxy diphenyl dimethyl methane and formaldehyde.

Polyesters and polyester amides which are obtained from polyhydric alcohols such as ethylene glycol and the like and polycarboxylic acids such as, adipic acid and the like, perhaps with concurrent use of diamines such as ethylene diamine and the like and amino alcohols such as ethanol amine and the like are also to be referred to. Tertiary amino groups can be incorporated just as well as quaternizable chlorine atoms into these polyesters.

It is also possible to start from those polyhydroxyl compounds which already contain urethane or urea groups. The polyhydroxyl compounds can be readily mixed with one another even those with or without quaternizable groups.

Suitable as organic polyisocyanates and preferably organic diisocyanates are, for example, all aliphatic and aromatic diisocyanates, also those known as being highly active, such as naphthalene-1,5-diisocyanate, diphenyl-4,4'-methane diisocyanate, dibenzyl-4,4'-diisocyanate, phenylene-1,3-diisocyanate, phenylene-1,4-diisocyanate, toluylene diisocyanates such as 2,4- and 2,6-toluylene diisocyanate and the like. Less reactive diisocyanates such as tetra-alkyl diphenylmethane diisocyanate, for example, 2,2',3,3'-tetramethyl diphenyl methane-4,4'-diisocyanate, dicyclohexyl methane diisocyanate and aliphatic diisocyanates such as hexamethylene diisocyanate offer the advantage of yielding reaction products with a substantially linear structure.

The quaternizable group can also be contained in the polyisocyanate. Polyisocyanates of this type, which can be mixed with the simple diisocyanates, can be obtained by reacting 2 mols of one of the aforementioned diisocyanates with methyl diethanolamine, butyl diethanolamine, N,N-dihydroxyethyl aniline, N,N-dihydroxyethyl toluidine and the like. Chain extenders with reactive hydrogen atoms, which may be concurrently used, may for example be the usual glycols, such as 1,4-butane diol, polyhydric alcohols such as trimethylol propane, diamines such as ethylene diamine and amino alcohols such as ethanolamine and the like. The quaternizable grouping can also be present in the chain extender. To be mentioned as examples are the addition products of 2 mols of ethylene oxide or propylene oxide to monoalkylamines, such as methyl diethanolamine, butyl diethanolamine, oleyl diethanolamine, N,N-dihydroxyethyl aniline, N,N-dihydroxyethyl toluidine, alkyl diisopropanolamine, such as methyl diisopropanolamine, aryl diisopropanolamine such as phenyl diisopropanolamine, dihydroxyethyl piperazine and the like.

The method preparing the aforesaid prepolymers is known. The components are brought together in any desired sequence. The quantity of polyisocyanate can be more or less than the equivalent quantity or even equal to the equivalent quantity relatively to the reactive hydrogen atoms of the polyhydroxyl compound being used and also possibly of the chain extender. Approximately equivalent quantities of diisocyanate are advantageously employed, so that a millable composition is obtained.

As already indicated, the components can also be reacted in organic solvents, for example benzene, chlorobenzene, acetone or ethyl acetate.

The subsequent quaternization takes place in a solvent at room temperature or at high temperature, possibly under pressure. Available as solvents are more especially polar solvents, such as alcohols, ketones, and cyclic ethers, for example ethanol, isopropanol, acetone, methyl-ethyl ketone, dioxane and acetonitrile; preferred solvents are those which are miscible with water. The concentration of the solution depends solely on the solution behavior of the polyurethane composition to be quaternized and of the quaternization product. Non-polar media, such as benzene, toluene or chlorobenzene, are less suitable, since a spontaneous cross-linking can occur in these during the quaternization, so that the entire mass gels; i.e. it is recommended, if the polyurethane composition has been produced in such a solvent, for this solvent to be at least partially replaced by one of or mixtures of the aforesaid polar solvents.

Examples of monofunctional quaternization agents are ethyl chloride, methyl bromide, dimethyl sulphate, diethyl sulphate, benzyl chloride, p-nitrobenzyl chloride, benyl bromide, ethylene chlorohydrin, ethylene bromohydrin, epichlorohydrin, bromobutane or p-toluene sulphonic acid esters. Triethylamine, diethylethanolamine, trimethylamine, pyridine or quinoline are mentioned as examples of tertiary amines. These agents are monofunctional in the sense that they have only one quaternizing or alkylating group.

It is also quite possible to use concurrently a polyfunctional quaternizing agent, i.e. a polyfunctional alkylation agent or a polyfunctional tertiary amine. The quantity should not exceed 50 percent of the total quantity of quaternizing agent, preferably 5 to 15 percent.

The quantity of monofunctional alkylation agent or monofunctional tertiary amine which is used depends on the number of the quaternizable groups present in the polyurethane composition which is preferably in solution. An excess is useless. Nevertheless, it is possible to use less than the calculated quantity of monofunctional quaternizing agent in order to vary the subsequent degree of cross-linking. If a bifunctional quaternizing agent is additionally used, this is generally not to exceed about 0.2 to about 0.8 percent of the weight of the polyurethane composition which is in solution. The quaternizing agent or the mixture of quaternizing agents can be simply introduced into the solution, possibly even in dissolved form.

It is quite possible for the solvent to be mixed from the outset with water, but care should be taken that the water which is present does not restrict the solubility of the polyurethane composition. After effecting quaternization, the organic solvent can be partially or even completely replaced by water. Those solutions which contain about 80–100 percent of water in the solvent are also of particular interest.

By simply removing the solvent, a flexible, elastic plastic is obtained, which is substantially resistant to water but in certain circumstances is soluble in acetone. This renders possible in a simple manner more especially the production of foils and coatings and the use as adhesion promoters by casting the solution onto suitable supports and removing the solvent while shaping. It may be expedient to effect the removal of the solvent at high temperatures, advantageously at about 60 to 100° C. A treatment of the foils, coatings and adhesions after removing the solvent at high temperature, e.g. at about 80–140° C., leads to an improvement in the strength and chemical resistivity.

According to one particular form of the process according to the invention about 3–30 percent by weight (based on the polyhydroxyl compound) of methyl diethanolamine is used as chain extender when producing the polyurethane, and the polyurethane composition is dissolved in acetone or alcohol, if desired with the addition of water, and quaternized with dimethyl sulphate. Thereafter, the organic solvent is largely or completely replaced by water. There are thus obtained substantially aqueous solutions or latex-type suspensions of the quaternized polyurethane composition, from which a homogeneous solid elastomer film remains after evaporation of the water. This film is advantageously treated with solutions containing chloride ions, such as common salt solution, whereby it becomes more resistant to aqueous agents.

The products of the process are suitable as coatings and impregnations, and also as adhesion promoters and for elastic films, foils and filaments. The solutions can serve as plasticizers and antistatic agents or as auxiliaries in cloth printing and in the paper industry, as a protective colloid and dispersion agent, if they are added to the materials to be dispersed, etc., it being readily possible for these materials to represent the main proportions by quantity. They are again processed by removing the solvent while shaping. In this sense, the products of the process are suitable as an emulsifier for polymerization reactions, as an additive to plastic dispersions and photographic layers, as sizing agent, for impregnating leather and raw skins, for sticking split leather, for preparing glass fibers and corded fabrics, as a binder for dyestuff pigments and in the cosmetic industry, as an additive to adhesives, and hair fixatives.

The invention is further illustrated by the following examples in which parts are by weight unless otherwise specified.

Example 1

About 1 kg. of polybutylene glycol ether (molecular weight 3000) is dehydrated for 30 minutes at about 130°/12 mm. Hg. About 167 g. of diphenylmethane-4,4'-diisocyanate are added to the melt at about 70° C. and the mixture is stirred for about 15 minutes while the temperature rises to about 80° C. After adding about 40 g. of methyl diethanolamine, the temperature rises quickly to about 100° C. and the melt becomes viscous. It is poured into boxes and finally heated for about 24 hours at about 100° C.

About 320 g. of the polyurethane composition which is obtained are dissolved in about 1300 ml. of benzene and the solution is boiled under reflux for about 8 hours after adding about 11 g. of ethylene bromohydrin. The solution becomes more viscous and slightly jelly-like. A sample poured onto a glass sheet leaves behind an elastomeric film of high extensibility and low modulus.

Example 2

About 1 kg. of polypropylene glycol ether (—OH number about 56) is dehydrated for about 20 minutes at about 130° C./12 mm. Hg. After incorporating about 375 g. of diphenylmethane-4,4'-diisocyanates while stirring, the temperature is kept for about 30 minutes at about 130° C., the mixture is then cooled to about 40° C. and about 120 g. of N-methyl diethanolamine are incorporated in one batch while stirring. The mass quickly becomes viscous and is poured into boxes and finally heated for about 24 hours at about 100° C.

About 200 g. of the polyurethane composition thus obtained are dissolved in about 1 litre of acetone and about 17.3 g. of dimethyl sulphate are added to the opaque solution. The temperature is slowly raised to about 50° C. while the viscosity of the solution increases considerably. Finally, the composition can scarcely be stirred, whereupon about 50 ml. of water are added dropwise. Acetone is distilled off at about 20° C. in vacuo from the mixture, which is now easily stirrable until the composition has again become viscous. About another 250 ml. of water are then gradually stirred in and acetone is again distilled off. A clear ointment-like mass remains (about 650 g.) which can be diluted with water to an opaque solution. After standing on a glass sheet for about 24 hours at room temperature, the solution yields a colorless, clearly transparent, elastic film, which is soluble in acetone and chloroform, softens in benzene and is not attacked by water and dilute hydrochloric acid. Tensile strength about 113 kp./cm.$^2$, breaking elongation about 774 percent.

Example 3

About 200 g. of the polyurethane composition prepared according to Example 2 are dissolved in 400 ml. of acetone and about 17 g. of dimethyl sulphate are added to the solution at 10–20°. The temperature is raised slowly to 50° C. and the mixture is left for one hour at this temperature, and about 50 ml. of water are added dropwise so that the mass still just remains capable of being stirred. Thereafter, about 100 ml. of water and about 1 kg. of o-benzyl hydroxydiphenyl polyglycol ether are added, acetone is extracted at 20–30° C. in vacuo until the clear viscous mass starts to become non-homogeneous, whereupon another 150 ml. of water are added and thereafter the acetone still present is completely extracted. A thick 39 percent aqueous dispersion of latex character remains and this dispersion, when cast onto glass sheets, supplies clear elastic films.

Example 4

The procedure is as set out in Example 3, but about 15.5 g. of dimethyl sulphate and about 0.8 g. of p-xylylene dichloride are added for the quaternization. The latex obtained yields clear films, which after being finally heated for about 1 hour at about 100° C. are no longer dissolved by acetone. Tensile strength about 146 kp./cm.$^2$, breaking elongation about 666 percent.

Example 5

About 800 g. of polypropylene glycol ether (—OH number about 56) are dehydrated for about 20 minutes at about 130° C./12 mm. Hg. After incorporating about 378 g. of diphenylmethane-4,4'-diisocyanate by stirring the temperature is kept for about 15 minutes at about 130° C. and then lowered to about 40° C. and the mixture of about 200 g. of polypropylene glycol ether and about 120 g. of N-methyl diethanolamine are incorporated by stirring all at once. The composition, which quickly becomes viscous, is poured into boxes and finally heated for about 24 hours at about 100° C.

About 165 g. of the resulting polyurethane composition (Defo hardness about 150; Defo elasticity about 5 at 80° C.) are dissolved in about 1 liter of acetone, whereupon about 12.6 g. of dimethyl sulphate and about 0.9 g. of p-xylylene dichloride are added to the solution, which is briefly heated to about 50° C. The solution supplies an opaque elastic film on a glass sheet.

Tensile strength about 207 kp./cm.$^2$, breaking elongation about 630 percent.

Example 6

About 700 g. of polypropylene glycol ether (—OH number about 56) are dehydrated for about 20 minutes at about 130° C./12 mm. Hg. After incorporation of about 500 g. of diphenylmethane-4,4'-diisocyanate, the mixture is kept for 15 minutes at about 130° C., cooled to about 40° C. and then the mixture of about 300 g. of polypropylene glycol ether and about 180 g. of N-methyl diethanolamine is stirred in all at once. The highly viscous white mass is poured into boxes and finally heated for about 24 hours at about 100° C. About 67.2 g. of the polyurethane rubber which is obtained are dissolved in about 168 ml. of acetone and the solution is quaternized with about 7.5 g. of dimethyl sulphate at about 50° C., while about 15 ml. of water are added dropwise so that the mass remains capable of being stirred. Thereafter, acetone is distilled off in vacuo until the mass has become viscous. After adding about 80 ml. of water, the acetone is extracted except for a small residue. The product is a milky white dispersion which yields on a glass sheet, a milky white hard and slightly elastic film. Tensile strength about 84 kp./cm.$^2$, breaking elongation about 314 percent.

Example 7

About 33 ml. of methyl chloride are added to 100 g. of the polyurethane composition in about 500 ml. of acetone obtained according to Example 5, and the solution is heated in an autoclave to about 120° C. After about 1 hour, reaction occurs with increase in temperature and pressure. The viscous mass thus obtained can be diluted with water and supplies clear elastic films after the solvent has evaporated.

Example 8

About 500 g. of polypropylene glycol (—OH number about 56) after dehydration, are reacted with about 174 g. of diphenyl-4,4'-methane diisocyanate for about 1 hour at about 130° C. After cooling the melt to about 50° C., about 300 cc. of methylethyl ketone and about 50 g. of methyl diethanolamine are added and the mixture is kept for about 1 hour at about 80° C., while about 590 ml. of methylethyl ketone are also added, so that a viscous 50 percent solution is formed.

About 26.4 g. of dimethyl sulphate are added to the solution at about 20–30° C.; thereafter, about 100 ml. of water are so added dropwise that the solution which becomes increasingly more viscous, still remains so that it can be stirred. It is kept for half an hour at 50° C. and as much of the solvent as possible is distilled off in vacuo. Thereafter, about 800 ml. of water are added and the remainder of the methylethyl ketone is extracted in vacuo. About a 30 percent aqueous suspension is left, which supplies clear elastic films on glass sheets.

It is to be understood that the foregoing examples are given for the purpose of illustration and that any other suitable prepolymer based on a polyhydroxyl compound, an organic polyisocyanate and, if desired, a chain extending agent could have been used therein together with any suitable solvent, monofunctional quaternization agent and the like provided that the teachings of this disclosure are followed.

Example 9

250 g. of a polyester prepared from adipic acid and hexane diol (OH number 64) are reacted after dehydration with 175 g. of toluylene diisocyanate for 30 minutes at 80° C. After cooling the melt to 30° C. a solution of 50 g. of 1,4-butane diol and 30 g. of N-methyl diethanol amine in 300 ml. of acetone is added. Thereby the temperature rises to 56° C. After keeping the solution two hours at 55° C. the solution becomes highly viscous, is diluted with 400 ml. of acetone and then kept for three hours at 55° C. A clear 47.5 percent solution of the polyurethane in acetone is obtained showing a viscosity of 20 stokes at room temperature.

The solution is heated together with 23.4 ccm. of dimethyl sulphate for 40 minutes to 50° C. and—while stirring—slowly mixed with 800 ccm. of water. Then the acetone is distilled off in vacuo at a water bath temperature of 50° C. A milky colloid solution results which is slightly viscous at a solid content of 38 percent. A solution is left which supplies hard elastic, fully transparent and light-stable films.

Example 10

1 kg. of the polyester of Example 9 is reacted for 30 minutes at 80° C. with 1168 g. of toluylene diisocyanate (isomer mixture 65:35) after dehydration. The solution boils after incorporating with stirring and thoroughly cooling a solution of 400 g. of 1,4-butane diol and 120 g. of N-methyl diethanol amine in 1.6 l. of acetone. After cooling to 30° C. and adding of 13 g. of water the solution is heated to 55° C. With evolution of carbon dioxide the solution becomes highly viscous within two hours. The solution after having been diluted with 3.6 l. of acetone is kept for three hours at 55° C. A 40 percent high-viscous polyurethane solution results which hardens at room temperature to a hard jelly mass which is soluble in hot acetone.

The solution is diluted with 1.5 l. of acetone and reacted at 55° C. with a solution of 92.5 ml. of dimethyl sulphate in 200 ml. of acetone. After 30 minutes 4 l. of water are added and the acetone is extracted in vacuo. A 46 percent latex results which supplies very hard films.

Example 11

1 kg. of the polyester of Example 9 is reacted for 30 minutes at 80° C. with 1296 g. of toluylene diisocyanate after dehydration. Into the melt is slowly incorporated a solution of 600 g. of diethylene glycol and 120 g. of N-methyl diethanol amine in 1.6 l. of acetone while stirring and thoroughly cooling. Within 1.5 hours at 55° C. the solution becomes opaque and highly viscous. The solution is diluted with 2 l. of acetone and then kept for two hours at 55° C. After addition of 88 ml. of dimethyl sulphate and 1400 ml. of water a clear solution is obtained. Then further 3100 ml. of water are added and the acetone is distilled off in vacuo. A viscous latex with a solid content of 55 percent results. The latex supplies hard films of good bending elasticity and high light stability.

Example 12

1 kg. of a polyester (molecular weight 620) prepared from adipic acid and ethylene glycol is reacted at 60° C. with 1512 g. of toluylene diisocyanate (isomer mixture 65:35) after dehydration. The temperature soon increases and is held for 30 minutes at 80° C. Into the melt a solution of 620 g. of diethylene glycol and 120 g. of N-methyl diethanol amine in 2 l. of acetone is incorporated at 30° C. and the strong exothermic reaction moderated by cooling. The high-viscous solution is stirred for four hours at 50° C. diluted with 2.8 l. of acetone and held for two hours at 50° C. A 46 percent high-viscous polyurethane solution is obtained.

400 g. of this solution are kept for 30 minutes at 50° C. with 5.3 ml. of dimethyl sulphate and then slowly reacted with 400 ml. of water. Then the acetone is distilled off in vacuo. A 37 percent low-viscous polyurethane latex is obtained, which, when poured onto glass plates and dried at 70° C., forms very hard, clear polyurethane films which do not swell much in water.

Example 13

450 g. of the polyurethane solution in acetone of Example 2 are heated with 16.4 ccm. of allyl chloride for 10 hours to 110° C. in a pressure vessel. After addition of 350 ccm. of water the acetone is distilled off in vacuo. A 37 percent viscous colloid solution results which dried to films of good tensile strength and rubber elasticity.

Example 14

The same experiment is made with 18.6 of p-toluene sulfonic acid methyl ester while heating for five hours to 90° C. A 38 percent thinly fluid latex results which dried to rubber-elastic films which do not swell much in water.

Example 15

The same experiment is made as in Example 13 with 12.7 g. of benzyl chloride. A thinly fluid 35 percent latex is obtained which dries to films of good tensile strength which do not swell much in water.

Example 16

1 kg. of a polyester (molecular weight 310) prepared from adipic acid and ethylene glycol is reacted at 40° C. with 1532 g. of toluylene diisocyanate (isomer mixture 65:35) after dehydration. The temperature soon increases and is held for 30 minutes at 80° C. Into the melt a solution of 450 g. of diethylene glycol and 120 g. of N-methyl diethanol amine in 2 l. of acetone is incorporated at 30° C., so that the reaction mixture starts to boil. The viscous solution is stirred for 6 hours at 50° C., diluted with 2.8 l. of acetone and kept for two hours at 50° C. A 45 percent polyurethane solution is obtained.

400 g. of this solution are reacted with 5.4 ccm. of dimethyl sulphate for 30 minutes at 50° C. and the resulting solution is diluted with water. After drying a hard glass-clear polyurethane film results.

Example 17

1 kg. of a polypropylene glycol ether (molecular weight 2000) is reacted with 341 g. of 4,4'-diphenyl methane diisocyanate after dehydration and the mixture is kept for 30 minutes at 130° C. After cooling to 40° C. 135 g. of N-butyl diethanol amine are added while stirring. While the temperature increases soon, the melt becomes highly viscous. The mass is poured onto a substrate and is after-heated for 24 hours at 100° C. A jet-colored, clear, rubber-like polyurethane mass results showing at 20° C. a Defo-hardness of 2400 and a Defo-elasticity of 28.

450 g. of a 33 percent solution of this mass in acetone is kept with 7.5 ccm. of dimethyl sulphate for 2.5 hours at 55° C. Then 300 ccm. of water are slowly added while stirring, whereby the viscosity increases and distills off the acetone in vacuo. A 34 percent viscous, aqueous-colloid solution is obtained which dries to clear, soft films showing the following values:

| | | |
|---|---|---|
| Tensile strength | kp./cm.$^2$ | 214 |
| Elongation at break | percent | 691 |
| Load at 100 percent elongation | kp./cm.$^2$ | 44 |
| Load at 500 percent elongation | kp./cm.$^2$ | 124 |
| Swelling in water after two hours | percent | 8 |
| Swelling in water after one day | do | 24 |
| Swelling in water in water in 1 percent of NaCl-solution after two hours | percent | 6 |
| Swelling in water in 1 percent NaCl-solution after one day | percent | 7 |

Example 18

The same experiment is made as in Example 17, but with only 3.75 ccm. dimethyl sulphate. The formed clear polyurethane foils show the following values:

| | |
|---|---|
| Tensile strength _____kp./cm.² | 158 |
| Elongation at break _____percent | 744 |
| Load at 100 percent elongation _____kp./cm.² | 20 |
| Load at 500 percent elongation _____kp./cm.² | 75 |
| Swelling in water after two hours _____percent | 5 |
| Swelling in water after one day _____do | 12 |
| Permeability to water vapour of a foil of 0.3 mm. thickness _____g./m.² a day | 82 |

Example 19

250 g. of propoxylated N-methyl diethanol amine (OH number 116) are dehydrated at 60° C. and then reacted with 141 g. of 4,4'-diphenyl methane diisocyanate. When the melt begins to become viscous, a solution of 25 g. of 1,4-butane diol in 300 ml. of acetic acid methyl ester is added. After two hours the highly viscous solution is diluted with 600 ml. of acetic acid methyl ester and kept for one hour at 60° C.

400 g. of the polyurethane solution thus obtained are heated with 20 ccm. of methyl chloride at 80° C. for four hours. Then 300 ccm. of water are added and the organic solvent is removed by distillation. An aqueous colloid polyurethane solution remains which when drying on a support gives clear hard-elastic and non-tacky films.

Example 20

250 g. of the polyester of Example 9 are reacted for 30 minutes at 80° C. with 191 g. of toluylene diisocyanate. Then 100 g. of trichloro propane diol are stirred onto a flat support and heated for 24 hours to 100° C. The rubber-like mass is dissolved in methyl ethyl ketone to give a 30 percent solution and then heated for six hours to 90° C. with 200 ccm. of trimethyl amine. After distilling off the excess of amine and of about half the amount of ketone 700 ccm. of water are dropped into the solution while stirring. Then the remainder of the organic solvent is distilled off. A milky latex remains which yields clear hard-elastic films.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. An aqueous dispersion of a quaternized polyurethane composition prepared by a process which comprises reacting an organic polyol with an organic polyisocyanate to prepare a polyurethane, at least one of said polyol or polyisocyanate containing a tertiary nitrogen atom, a halogen atom or an R—SO$_2$—O— group, reacting the resulting polyurethane in an organic solvent with a monomeric monofunctional alkylation agent containing a halogen atom or an R—SO$_2$—O— group when said reactants contain a tertiary nitrogen atom or a monofunctional tertiary amine when said reactants contain a halogen atom or an R—SO$_2$—O— group to form an organic solvent solution of quaternized polyurethane, adding water to the resulting organic solvent solution of quaternized polyurethane and then removing said organic solvent to form an aqueous dispersion of said quaternized polyurethane.

2. The aqueous dispersion of claim 1 wherein R is alkyl having 1 to 12 carbon atoms.

3. The aqueous dispersion of claim 1 wherein a portion of said organic polyol is a chain extending agent containing at least two active hydrogen atoms.

4. The aqueous dispersion of claim 1 wherein a portion of said organic polyol is a chain extending agent containing at least two active hydrogen atoms which contains only one tertiary nitrogen atom.

5. The aqueous dispersion of claim 1 wherein a portion of said organic polyol is a chain extending agent containing only one tertiary nitrogen atom and at least two active hydrogen atoms and the balance of said organic polyol is a predominantly linear polyether or polyester polyol having a molecular weight of from about 400 to about 10,000.

6. The aqueous dispersion of claim 1 wherein said polyurethane prepared from said organic polyol and said organic polyisocyanate contains a tertiary nitrogen atom and said monofunctional alkylating agent is dimethylsulfate.

References Cited

UNITED STATES PATENTS

| | | | |
|---|---|---|---|
| 3,036,998 | 5/1962 | Rudner | 260—77.5 |
| 3,180,853 | 4/1965 | Peters | 260—77.5 |
| 3,173,896 | 3/1965 | Adams et al. | 260—75 |
| 3,294,752 | 12/1966 | Wilkinson. | |

FOREIGN PATENTS 880,485   6/1953   Germany.

DONALD E. CZAJA, *Primary Examiner.*

LEON J. BERCOVITZ, *Examiner.*

F. McKELVEY, *Assistant Examiner.*